(12) United States Patent
Kawabata et al.

(10) Patent No.: US 7,264,760 B2
(45) Date of Patent: Sep. 4, 2007

(54) METHOD FOR PRODUCING A BATTERY PACK AND A BATTERY PACK PRODUCED THEREIN

(75) Inventors: Katsuhiko Kawabata, Sumoto (JP); Hiroki Teraoka, Miharagun (JP); Mikitaka Tamai, Tsunagun (JP); Hiroshi Osaka, Tsunagun (JP)

(73) Assignee: Sanyo Electric Co., Ltd., Osaka (JP)

( * ) Notice: Subject to any disclaimer, the term of this patent is extended or adjusted under 35 U.S.C. 154(b) by 581 days.

(21) Appl. No.: 10/353,021

(22) Filed: Jan. 29, 2003

(65) Prior Publication Data

US 2003/0141841 A1 Jul. 31, 2003

(30) Foreign Application Priority Data

Jan. 31, 2002 (JP) .............................. 2002/023360

(51) Int. Cl.
B29C 45/14 (2006.01)
(52) U.S. Cl. .................... 264/272.21; 320/112
(58) Field of Classification Search ................ 320/112, 320/107, 108, 110; 429/96, 97, 98, 99, 100, 429/180; 362/183; 368/10, 203; 264/261, 264/272.21, 275, 277, 278
See application file for complete search history.

(56) References Cited

U.S. PATENT DOCUMENTS 4,466,742 A * 8/1984 Lemelson ................... 368/10
4,935,581 A * 6/1990 Komathu ................... 174/52.4
6,225,778 B1 * 5/2001 Hayama et al. ............. 320/112
6,388,636 B1 * 5/2002 Brown et al. ............... 343/866
6,492,058 B1 * 12/2002 Watanabe et al. ........... 429/121
6,524,732 B1 * 2/2003 Iwaizono et al. ............. 429/7
6,803,144 B2 * 10/2004 Hovi et al. ................. 429/123
2003/0082441 A1 * 5/2003 Hovi et al. ................. 429/123

FOREIGN PATENT DOCUMENTS

| JP | 2000-243364 | 9/2000 |
| JP | 2000-315483 | 11/2000 |
| JP | 2002-260609 | 9/2002 |
| JP | 2003-17016 | 1/2003 |
| JP | 2003-86159 | 3/2003 |
| JP | P2003-168406 A * | 6/2003 |

* cited by examiner

Primary Examiner—Karl Easthom
Assistant Examiner—Aaron Piggush
(74) Attorney, Agent, or Firm—Wenderoth, Lind & Ponack, L.L.P.

(57) ABSTRACT

Tips of the lug portions of a board touch the bottom of the opening between projecting portions and step portions, when the upper mold and the lower mold are fit together with a battery and board inserted. Thus the board is retained in position in the molds certainly. After the molds are fit together, polyamide resin is injected into a molding space from a resin-material-injecting orifice provided in the upper mold.

13 Claims, 4 Drawing Sheets

METHOD FOR PRODUCING A BATTERY PACK AND A BATTERY PACK PRODUCED THEREIN

This application is based on Application No. 23360 filed in Japan on Jan. 31, 2002, the content of which is incorporated hereinto by reference.

BACKGROUND OF THE INVENTION

The present invention relates to a method for producing a battery pack used as a power source for an electronic device, etc. and a battery pack produced therein.

Recently, a battery pack, which has an outer case of resin with a battery and a board mounting a protection circuit for preventing over-charging or over-discharging when charged or discharged, is used for a device such as a mobile phone, etc.

In such a battery pack, the battery and the board are mounted in the outer case, which is composed of an upper case and lower case, so as to be held conventionally. Recently, a low-temperature-mold resin is injected between the board and the battery or covers the battery to form molded resin. Such method is employed for reducing the number of parts and improving manufacturing efficiency.

Further, recently, external input-output terminals connecting the battery pack with an external circuit are not provided with lead wires but are formed on one surface of the board so as to be exposed to the outside, so that the battery pack is downsized.

On the other hand, generally, in manufacturing of the battery packs, the external input-output terminals should be accurately positioned at the relative position against the outer case or the mold resin. Thus, it is required that the board is retained against the battery previously when the low-temperature-mold resin is injected. In particular, the board is retained in position by a resin holder interposed between the board and the battery before the resin is injected, then they are molded with the holder together. Such method is also employed conventionally.

However, in this method, the holder interposed between them interferes with the flow of the resin during injection. Thus, the battery pack that is molded with the occurrence of the impaired flow of the resin may have cracks or pinholes in the inside or the outside of the molded resin. In such a case, the battery pack may have a problem such that an airtight connection between the board and the battery to be molded by the mold resin might not be achieved sufficiently, or sufficient mechanical strength might not be achieved. Such problems can reduce yield.

On the other hand, reducing the injecting velocity of the resin or increasing temperature of the resin or injecting pressure can reduce the occurrence of the impaired flow of the resin. However, it may cause other problems such as reduced manufacturing efficiency, or the battery or the protection circuit might be damaged.

Further, it is considered that employing resin material to be injected with low viscosity can reduce the occurrence of the impaired flow of the resin. However, the material having low viscosity at injection does into have sufficient mechanical strength as mold resin for the finished product.

The present invention has been developed to solve the above problems, and therefore, is aimed to at providing: a method for producing a battery pack with accuracy of positioning the external input-output terminals in high yield, without reducing manufacturing efficiency, and without increasing the number of the components; and a battery pack produced by the method.

SUMMARY OF THE INVENTION

To solve the above problems, in the method for producing a battery pack of the present invention a battery is retained in a battery-retaining portion provided in a mold, which has the battery-retaining portion and a board-retaining portion interposed in a space between them; a board with external input-output terminals is retained in the board-retaining portion; and mold material is injected into the space to form a mold portion.

In the method for producing a battery pack, the mold material is injected while retaining the board in the board-retaining portion, therefore it can prevent the deviations in positioning the board due to the flow of the mold material. Thus, it is possible to mold while accurately positioning the board against the molded part, even without employing a holder to retain the board against the battery as in the conventional method.

Accordingly, the method can produce a battery pack with accurately positioned external input-output terminals without the occurrence of the impaired flow of the resin during the injecting process.

In the above method for producing a battery pack, it is preferable that the board-retaining portion is formed in an opening provided on each internal surface of upper and lower parts of the mold, and each side of the board is inserted in each opening of the upper and lower parts so as to position the board to be retained. It can facilitate the producing and positioning of the board.

Further, in the above method for producing a battery pack, it is preferable that the mold material is injected from an injecting orifice provided at a position facing the space. It can perform corner-to-corner injecting of the mold material into the molding-material-injecting space efficiently.

In the above method, it is preferable that the mold material to be injected into the inside of the mold is polyamide resin, which has sufficient flowability even at low temperature (not more than 240° C. and under low pressure, around 0.5-1 MPa).

Furthermore, the battery pack of the present invention includes: a battery; a board having external input-output terminals, which are connected to the battery electrically; and a resin member molded in a space between the battery and the board so as to form an integral structure, wherein, the board is held to the battery by the resin. The battery pack can hold the board and the battery by the resin without a holder interposed between them, so that it is advantageous in terms of weight and cost.

In addition, the resin can smoothly flow during molding, so that it can provide high quality without cracks and pinholes in its inside or outside.

The above and further objects and features of the invention will be more fully apparent from the following detailed description in conjunction with the accompanying drawings.

DETAILED DESCRIPTION OF THE INVENTION

Figure 1A:
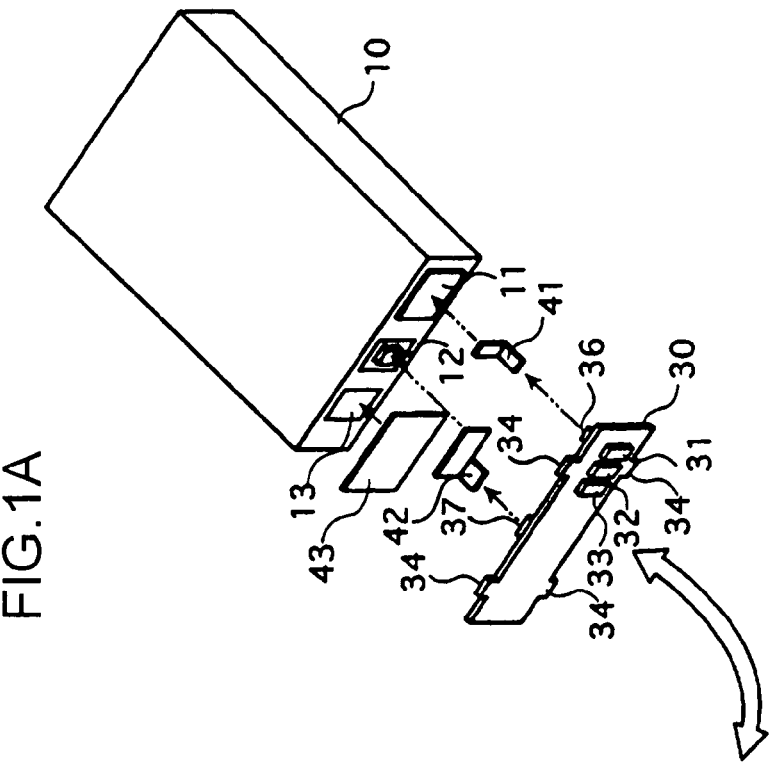
FIG. 1A is an exploded view of the internal components of a battery pack according to an embodiment of the invention.
Figure 2:
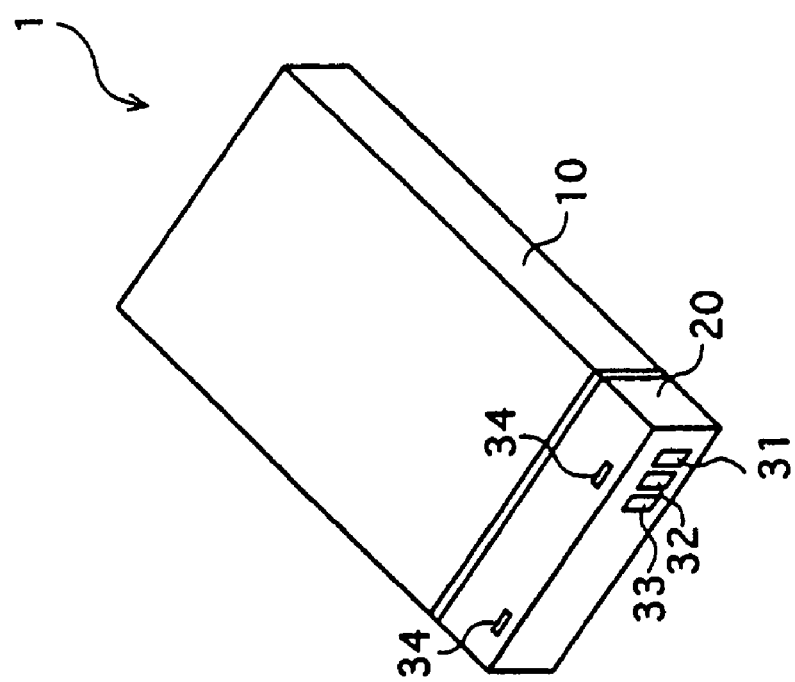
FIG. 2 is a perspective view of the battery pack shown in FIG. 1.

The following description will describe a battery pack 1 according to an embodiment of the invention shown in FIG. 1A and FIG. 2. FIG. 1A is an exploded view of the internal components of the battery pack 1. FIG. 2 is an external illustration showing a perspective view of the battery pack 1.

As shown in FIG. 1A, in the battery pack 1, a board 30 is provided to face a surface, on which terminals 11, 12, etc. of a lithium-ion battery 10 are formed. As shown in FIG. 2, a molded resin portion 20 is provided so as to fill the space between the lithium-ion battery 10 and the board 30, and to cover the board 30. However, the external input-output terminals 31, 32, 33 are exposed to the outside.

As shown in FIG. 1A, the positive terminal 11, the negative terminal 12, a safety valve 13, etc. are formed on the surface of the lithium-ion battery 10 at the side, which opposes the board.

Actually, the positive terminal 11 is formed of a clad material plate of Al—Ni connected onto an outer case of Al.

In addition, the negative terminal 12 is a projecting terminal covered at its periphery by an insulator so as to be electrically separated from the outer case.

The safety valve 13 is provided to exhaust internal gas when the internal pressure is greater than a predetermined threshold.

On the other hand, the board 30 is a resin board with a main surface, on which the external input-output terminals 31, 32, 33, etc. are formed. The board 30 is formed in a rectangular shape with a substantially similar size to the surface of the lithium-ion battery 10, to which it is opposed. A pair of lug portions 34 is provided at each longitudinal side of the board 30.

Figure 1B:
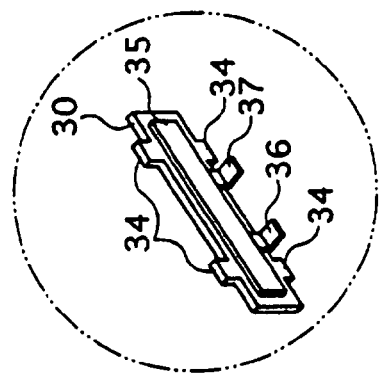
FIG. 1B is a detailed view of the board shown in FIG. 1A.

As shown in a detailed view of FIG. 1B, a circuit portion 35 and connecting terminals 36, 37 are provided on the surface that is opposite with respect to the surface, on which the external input-output terminals 31, 32, 33, etc. are formed.

A protection circuit for protecting the lithium-ion battery 10 from over-charging or over-discharging when charged or discharged, a breaker, etc. are formed in the circuit portion 35. The circuit portion 35 and each of the external input-output terminals 31, 32, 33 are connected via holes opening in the direction of thickness of the board 30.

As shown in FIG. 1A, leads 41, 42, insulating paper 43, etc. are provided between the lithium-ion battery 10 and the board 30.

Both of the leads 41, 42 are formed as an L-shaped plate of Ni connecting the positive terminal 11 and the negative terminal 12 of the lithium-ion battery 10 with the connecting terminals 36, 37 of the board. In addition, the leads 41, 42 are connected with the respective terminals 11, 12, 36, and 37 by spot welding.

Further, the insulating paper 43 is inserted for insulation between the lead 42 connected with the negative terminal 12 and the outer case, which is the positive electrode. In addition, the insulating paper 43 plays a role as a protect film preventing resin material from bursting the safety valve 13 (because the safety valve 13 is a very thin aluminum film), when the molded resin portion 20 is molded as described below. Furthermore, it also plays a role of a gas-exhausting path for exhausting the gas toward the outside of the battery pack 1, if the internal pressure of the lithium-ion battery 10 rises and bursts the safety valve 13 to expose an opening in the case which is covered by the safety valve 13.

As mentioned above, the external input-output terminals 31, 32, and 33 are exposed in the surface portion of the molded resin portion 20 (the portion covering the main surface of the board 30). The terminal 31 is a positive side terminal, and the terminal 32 is a negative side terminal. The battery pack 1 inputs or outputs its electric power to the external circuit via these terminals 31, 32.

Additionally, the terminal 33 is a so-called device type determining resistance terminal. It is provided so that the device side can determine the battery type when the battery pack 1 is attached to the device.

Further, the above lug portions 34 are exposed in the top surface and the bottom surface of the molded resin portion 20 (the bottom surface side is not shown).

Process of Molding the Molded Resin 20

A process of molding the molded resin 20, which is one of the features of the method for producing the battery pack 1 of the embodiment, will be described below with reference to FIG. 3 and FIG. 4.

Figure 3:
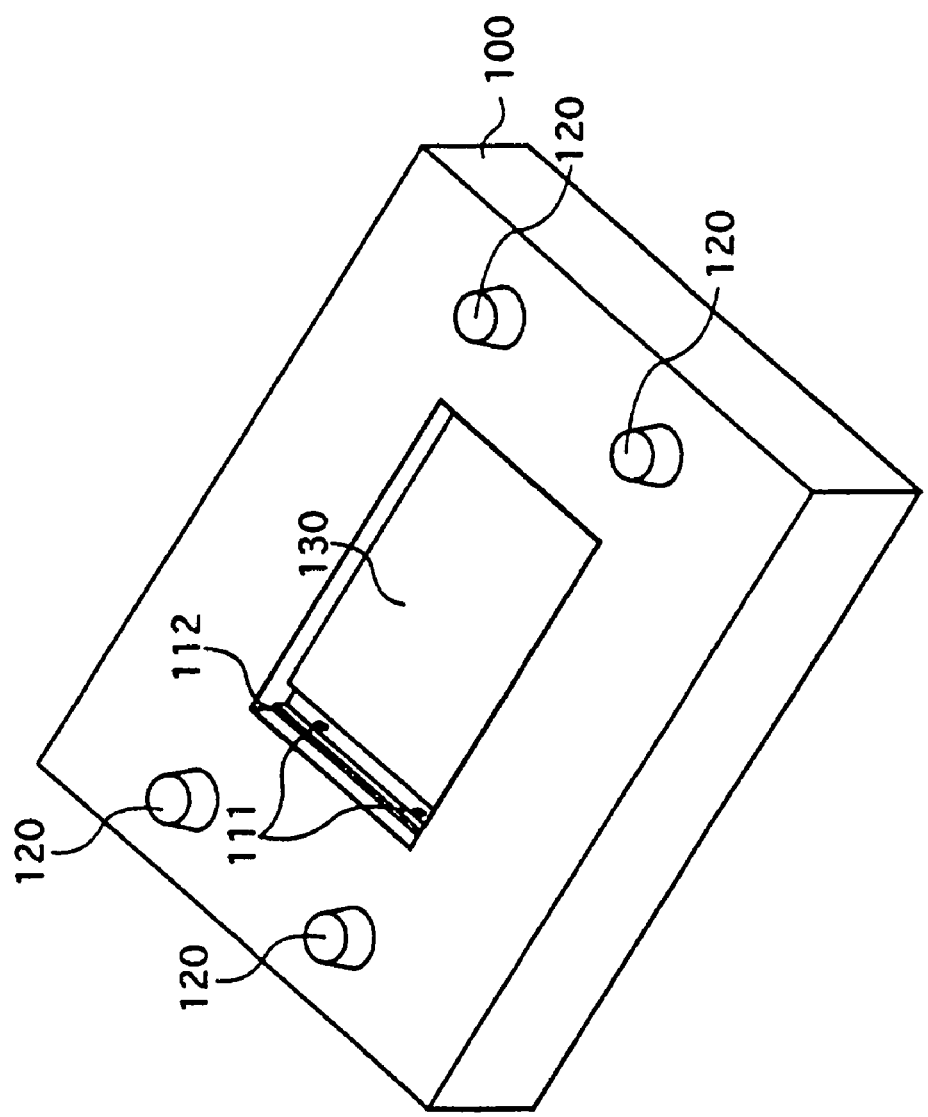
FIG. 3 is a perspective view of the lower mold used for resin molding of the battery pack.

As shown in FIG. 3, a recess portion for mounting the above lithium-ion battery 10 and the board 30, etc. is formed in a lower mold 100 which is used for molding the molded resin portion 20.

A battery-retaining portion 130, formed in the inside surface of the recess portion, is capable of accurately positioning the lithium-ion battery 10.

Further, projections 111 and a step portion 112 are formed in an inside surface of the recess portion so as to be spaced from the battery-retaining portion 130. Opening portions are formed between the projections 111 and the step portion 112 for positioning the board 30 in the inside of the mold 100.

In addition, the shape of the lower mold 100 is described above with reference to FIG. 3, and the upper mold 200 has a similar shape with an opening formed between the projections 211 and the step portion 212.

A process of molding the molded resin portion 20 with such molds 100, 200 will be described below with FIG. 4. FIG. 4 is a cross-sectional view showing the lithium-ion battery 10 and the board 30 retained in the inside of the lower mold 100 and the upper mold 200.

First, the lithium-ion battery 10 and the board 30 are connected to each other and mounted in the lower mold 100, then the upper mold 200 and the lower mold 100 are fit together.

Figure 4:
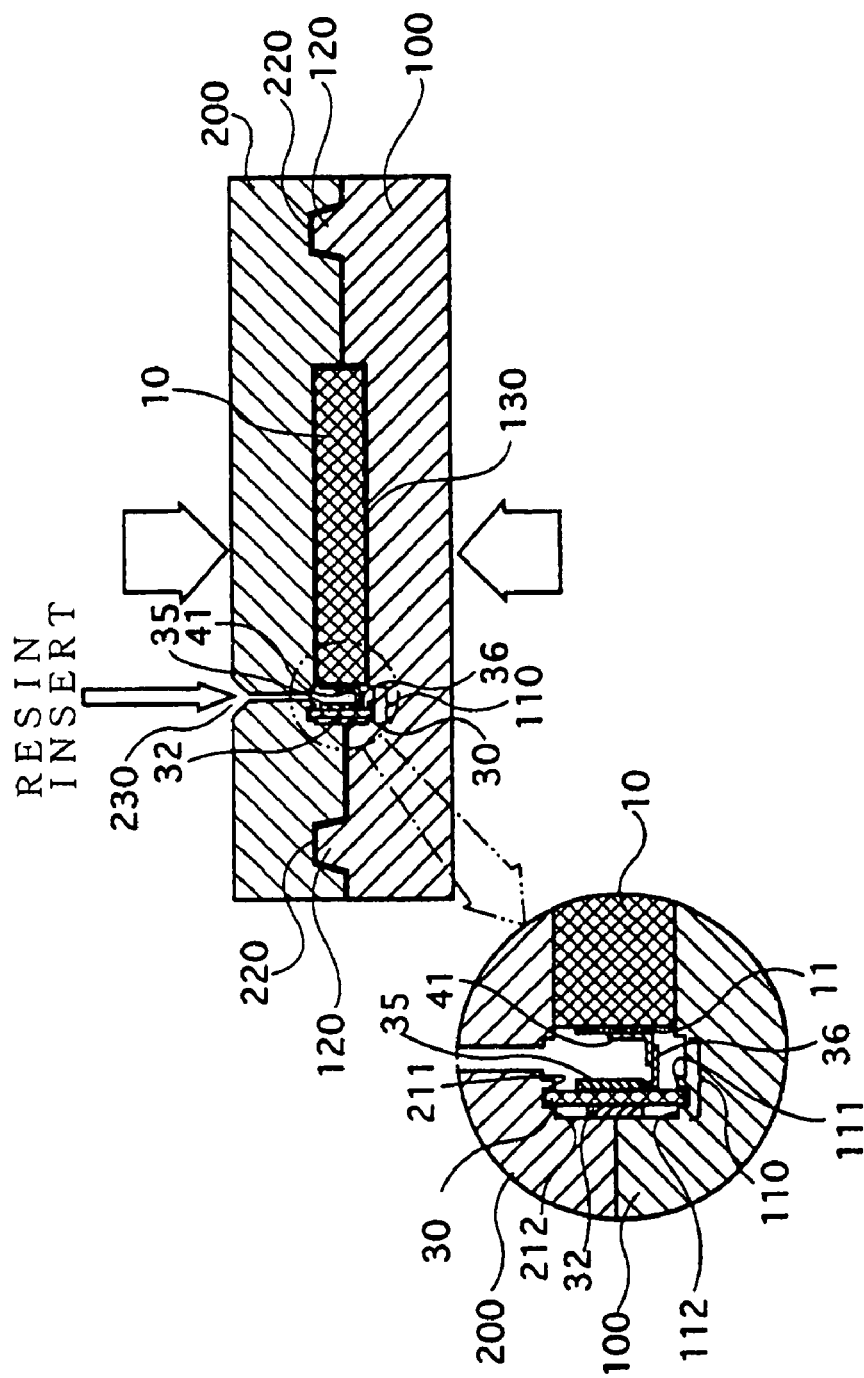
FIG. 4 is a cross-sectional view showing the relationship of the upper mold, the lower mold, the battery, and the board when the resin molding of the battery pack is performed.

As shown in FIG. 4, when the upper mold 200 and the lower mold 100 are fit together and inserted, the tips of the lug portions 34 of the board 30 touch the bottom of the openings between the projecting portions 111, 211 and the step portions 112, 212. Thus the board 30 is reliably retained and positioned in the molds 100, 200 certainly.

As mentioned above, after the upper mold 200 and the lower mold 100 are fit together and inserted, polyamide resin is injected into the molding space 110 (the space to form the molded resin portion 20) from a resin-material-injecting orifice 230 provided in the upper mold 100 (resin temperature: around 200-230° C., molding pressure: around 0.5-1 Mpa). Here, as shown in FIG. 4, resin-material-injecting orifice 230 is provided at a position facing the space between the lithium-ion battery 10 and the board 30 so as to efficiently perform corner-to-corner injection of the resin into the molding space 110.

The molded resin portion 20 is formed as mentioned above. The board 30 is also retained by being sandwiched between the projecting portions 111, 211 and the step portions 112, 212 formed in the inner surface of the lower mold 100 and the upper mold 200 when the polyamide resin is injected, so that the occurrence of the positioning deviation against the molds 100, 200 can be prevented even under the pressure of resin injection.

Accordingly, in the above molding process, the molded resin 20 and the board 30 are accurately positioned.

In addition, the lithium-ion battery 10 and the board 30 are held without a holder, therefore the flow of the resin material is not interfered with during the molding process. That is, the method can provide smooth flow of the resin without increasing the temperature or pressure of the injected resin, and without reducing the injecting velocity.

Thus, the battery pack 1 produced by the above process can be obtained without cracks and pinholes in the molded resin portion 20 caused by the impaired flow of the resin. Further, high positioning accuracy of the external input-output terminals 31, 32, and 33 is achieved.

In addition, in the method of producing the battery pack 1, it is not necessary to increase the temperature or pressure of the injected resin in order to achieve a smooth flow of the resin. Therefore, deleterious effects on the circuit portion 35 and the lithium-ion-battery 10, caused by high heat or pressure can be avoided, so that their performance is not impaired.

In this embodiment, the battery pack having one prismatic type lithium-ion battery inside is described as one example. However, the shape, type, the mount number of the battery, etc. are not restricted to this embodiment. For example, the invention can be applied to a battery pack having a plurality of cylindrical type nickel-cadmium batteries.

Additionally, polyamide resin is employed as the material of the molded resin portion 20, however, insulating material capable of insert molding at low temperature, and under low pressure can be employed. For example, polyurethane resin can be employed as the material.

Furthermore, in the above embodiment, the opening is formed so as to hold the board 30 with the fixed projecting portions 111, 211 and step portions 112, 212, which are formed in the molds 100, 200, however, the opening (groove, recess, gap, etc.) for retaining the board is not restricted to this shape.

Moreover, it should be appreciated that the projecting portion 111 may be provided so as to be movable in up-and-down by a cylinder, etc. That is, the projecting portion 111 can be moved higher when the lithium-ion battery 10 and the board 30 are mounted into the lower mold 100, and moved relatively lower according to inserting the upper mold 200 so as to fit together. This permits the recess portion, which remains on the surface of the molded resin portion 20 in the battery pack, to be made smaller. Thus, it can provide preferable quality with respect to the appearance. However, in all cases, it is preferable that the projecting portions 111, 211 and the step portions 112, 212 are shaped so as to minimize any interference with the flow of the injected resin.

In the method for producing a battery pack mentioned above, a battery is retained in a battery-retaining portion provided in a mold, which has the battery-retaining portion with a space and a board-retaining portion interposed between them; a board with external input-output terminals is retained in the board-retaining portion; and mold material is injected into the space to form a molded portion.

In this method, the mold material in injected while retaining the board in the board-retaining portion inside of the mold, therefore high positioning accuracy of the external input-output terminals can be achieved, and the occurrence of impaired flow of the resin can be avoided.

In addition, the above battery pack includes: a battery; a board having external input-output terminals, which are connected to the battery electrically; and resin molded in a space interposed between the battery and the board so as to form an integral structure, wherein, the board is attached to the battery with the resin.

The battery pack can hold the board and the battery by the resin without providing a holder between them, so that advantages are realized with respect to weight and cost.

Additionally, since the resin can be smoothly flowed when molding, it can provide high quality without cracks and pinholes in the inside or outside of the molded portion.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A method for producing a battery pack, the method comprising:

retaining a battery and a board in a mold, the battery being retained in a battery-retaining portion of the mold and the board having at least one lug portion received in a board-retaining portion of the mold to thereby retain the board in the board-retaining portion of the mold, wherein the board-retaining portion and the battery-retaining portion are positioned so that a space is formed between the battery and the board, and the board includes external input-output terminals; and injecting mold material into the space in the mold between the battery and the board so as to form an integral structure in which the board is held to the battery by the mold material, and the external input-output terminals are exposed to the outside, wherein the board-retaining portion of the molded comprises:

a lower step portion formed in a lower part of the mold and at least one lower projection that projects upwardly from a surface of the lower part of the mold such that a lower gap is defined between the lower step portion and the lower projection; and an upper step portion formed in an upper part of the mold and at least one upper projection that projects downwardly from a surface of the upper part of the mold such that an upper gap is defined between the upper step portion and the upper projection, wherein the sides of the board are received in the lower and upper gaps, respectively, so as to retain the board in the mold.

2. The method according to claim 1, wherein the board-retaining portion is formed in a recess portion on each internal surface of upper and lower parts of the mold, and each side of the board is inserted in each recess of the upper and lower parts so as to position the board to be retained.

3. The method according to claim 1, wherein the lug portion projects from a longitudinal side of the board such that an end face of the lug portion is exposed to the outside of the mold material.

4. The method according to claim 1, wherein the lower projection can be actuated by a cylinder in order to position the board.

5. The method according to claim 4, wherein the lower projection is actuated higher when the battery and the board are mounted into the mold, and is actuated lower when inserting the upper part of the mold onto the lower part of the mold.

6. The method according to claim 2, wherein the mold material is injected through an injecting orifice provided in a position communicating with the space.

7. The method according to claim 1, wherein the mold material is polyamide resin.

8. The method according to claim 1, wherein the mold material is polyurethane resin.

9. The method according to claim 7, wherein the polyamide resin is injected into the space between the battery and the board with a molding pressure of 0.5-1 Mpa and at a temperature of 200-230° C.

10. The method according to claim 1, wherein the at least one lug portion comprises a first pair of lug portions extending from a first longitudinal side of the board and a second pair of lug portions extending from a second longitudinal side of the board.

11. A method for producing a battery pack, the method comprising:

retaining a battery in a battery-retaining portion provided in a mold;

retaining a board having external input-output terminals in a board-retaining portion provided in the mold, the board having a lug portion that projects from a longitudinal side of the board and is inserted into the board-retaining portion of the mold, wherein the battery and the board are connected, and the battery-retaining portion and the board-retaining portion are positioned in the mold so as to create a space between the battery and the board; and injecting resin material into the space between the battery and the board to form an integral structure comprising the battery, the board and the molded resin material which adheres the battery to the board, wherein the board-retaining portion comprises at least one projection formed in a lower portion of the mold and at least one projection formed in an upper portion of the mold, and step portions spaced from the projections, respectively, and opposite sides of the board are inserted between the projections and the respective step portions so as to retain the board in a predetermined position.

12. The method according to claim 11, wherein the resin material is polyamide resin.

13. The method according to claim 11, wherein the resin material is polyurethane resin.

* * * * *